United States Patent [19]
Fitzgerald et al.

[11] Patent Number: 5,473,362
[45] Date of Patent: Dec. 5, 1995

[54] VIDEO ON DEMAND SYSTEM COMPRISING STRIPPED DATA ACROSS PLURAL STORABLE DEVICES WITH TIME MULTIPLEX SCHEDULING

[75] Inventors: Robert P. Fitzgerald, Redmond; Joseph S. Barrera, III; William J. Bolosky, both of Issaquah; Richard P. Draves, Jr., Kirkland; Michael B. Jones; Steven P. Levi, both of Redmond; Nathan P. Myhrvold, Bellevue; Richard F. Rashid, Woodinville, all of Wash.; Garth A. Gibson, Pittsburgh, Pa.

[73] Assignee: Microsoft Corporation, Redmond, Wash.

[21] Appl. No.: 159,188

[22] Filed: Nov. 30, 1993

[51] Int. Cl.$^6$ .................................................. H04N 7/173
[52] U.S. Cl. ................................................ 348/7; 348/13
[58] Field of Search ................................. 348/7, 12, 13, 348/6; 455/4.2; 358/335, 339, 343; H04N 7/173, 7/16, 7/10, 5/92, 5/93

[56] References Cited

U.S. PATENT DOCUMENTS

| 5,119,188 | 6/1992 | McCalley et al. | 358/86 |
|---|---|---|---|
| 5,133,079 | 7/1992 | Ballantyne et al. | 455/4.1 |
| 5,339,315 | 8/1994 | Maeda et al. | 455/4.2 |
| 5,371,532 | 12/1994 | Gelman et al. | 455/4.2 |

FOREIGN PATENT DOCUMENTS

| 269087 | 9/1992 | Japan | 348/7 |
|---|---|---|---|
| 35407 | 2/1993 | Japan | G06F 3/06 |
| 91/03112 | 3/1991 | WIPO | H04H 1/00 |
| 92/12599 | 7/1992 | WIPO | H04N 7/173 |

OTHER PUBLICATIONS

Nishimura, Kazutoshi, "Video-on-Demand System Using Optical Mass Storage System", Sep. 18, 1993, pp. 5433–5438.

Primary Examiner—James J. Groody
Assistant Examiner—Chris Grant
Attorney, Agent, or Firm—Seed and Berry

[57] ABSTRACT

A scalable method and system for easily scheduling data transfer for a video-on-demand server system is provided. A strategy for locating available bandwidth and allocating available bandwidth to subscribers as needed is provided. The input/output bandwidth of storage devices that store data for video image sequences is modelled as a series of bandwidth units. Each bandwidth unit has sufficient capacity to service an individual subscriber during a scheduling cycle. Video image sequences or other data sequences are striped across storage devices such that data for a data sequence is forwarded to the subscriber by reading from a sequence of storage devices in consecutive time frames.

23 Claims, 7 Drawing Sheets

VIDEO ON DEMAND SYSTEM COMPRISING STRIPPED DATA ACROSS PLURAL STORABLE DEVICES WITH TIME MULTIPLEX SCHEDULING

TECHNICAL FIELD

The present invention relates generally to data processing systems and, more particularly, to video-on-demand systems.

BACKGROUND OF THE INVENTION

Most conventional cable video systems provide subscribers with a number of different viewing choices. The different viewing choices are broadcast on separate channels, and a subscriber selects a viewing choice by tuning their television to the channel associated with the viewing choice. The number of viewing choices is limited by the number of available channels. An additional limitation in conventional cable video system is that the times at which the viewing choices begin are fixed.

One service provided in conventional cable video systems that has gained popularity is pay-per-view channels. Pay-per-view channels make available to subscribers selected viewing choices that start playing at fixed times. A subscriber contacts a cable station to request that he view a viewing choice that is being provided on a pay-per-view channel at a fixed time. The cable station responsible for programming the pay-per-view channel then switches the connection to the subscriber so that the viewer receives the broadcast of the requested viewing choice beginning at the designated start time. Different viewing choices are output on respective channels.

SUMMARY OF THE INVENTION

Both conventional cable systems and pay-per-view systems have a number of limitations. The present invention eliminates these limitations. In accordance with a first aspect of the present invention, a method is practiced in a system having a sequence of storage devices for storing data sequences. The data sequence includes blocks of data that are stored as stripes across the sequence of storage devices. The data sequence may hold audio data, video data, or other appropriate types of data. In this method, the scheduling of data transfers for each storage device is time-multiplexed to a sequence of time slots. Each time slot is a sufficient amount of time to transfer a block of data for the selected data sequence. The sequence of time slots for each storage device is the same except that the sequence of time slots for each storage device is time-shifted relative to its predecessor in the sequence of storage devices. A bandwidth unit that is not being used is then located. A bandwidth unit includes a like-positioned time slot in each sequence of time slots for storage devices in the sequence of storage devices. The located bandwidth unit is scheduled to transfer blocks of data for the selected data sequence relative to the storage devices. As a result, during each consecutive time slot in the located bandwidth unit, a consecutive block of data for the selected day sequence is transferred relative to the appropriate storage device. The transfer of data may involve the input of data for storage on the storage devices or alternatively may involve the output of data read from the storage devices.

In accordance with another aspect of the present invention, a system includes a plurality of storage devices that are logically organized into a sequence. The storage devices store data sequences comprised of blocks of data. The blocks of data sequences are striped across the sequence of storage devices. The system also includes a time-multiplexer scheduler for dividing the time slots for each storage device. Transfers of data are scheduled by the scheduler relative to each storage device as a sequence of time slots. Each time slot is a sufficient amount of time to output a block of data in a data sequence. The sequence of time slots for each storage device is the same, but each sequence of time slots for a storage device is time-shifted relative to the time slot sequence for a predecessor storage device in the sequence of storage devices. The system further includes a free bandwidth unit locator for locating a free bandwidth unit that is not being used. An assignment mechanism is provided in the system for cooperating with the time-multiplexer scheduler to schedule the free bandwidth unit that has been located by the free bandwidth locator. The assignment mechanism schedules the free bandwidth unit to transfer blocks of data of a data sequence such that a block of data is transferred relative to one of the storage devices during each time slot of the bandwidth unit. It should be appreciated that the storage devices may be any of a number of different type of storage devices, including optical disk drives, magnetic disk drives, RAM devices, EPROM devices, flash EPROM devices, or ROM devices.

DETAILED DESCRIPTION OF THE INVENTION

The preferred embodiment of the present invention provides a scalable approach to scheduling of bandwidth on a video on demand server. The scheduling is scalable in that the scheduling approach may be scaled easily to facilitate a changing number of video image sequences stored by the server and a changing number of subscribers requesting video image sequences. Moreover, the scheduling approach of the preferred embodiment of the present invention is easily implemented.

Bandwidth, as used in this context, is intended to refer to the input/output capacity (for a fixed time frame) of storage devices that hold data for video image sequences. The preferred embodiment of the present invention will be described below relative to an implementation that concerns output bandwidth (i.e., reading data from storage devices holding video image sequences), but those skilled in the art will appreciate that the present invention may also be applied to input bandwidth as well (i.e., writing video image sequence data to storage devices).

Figure 1:
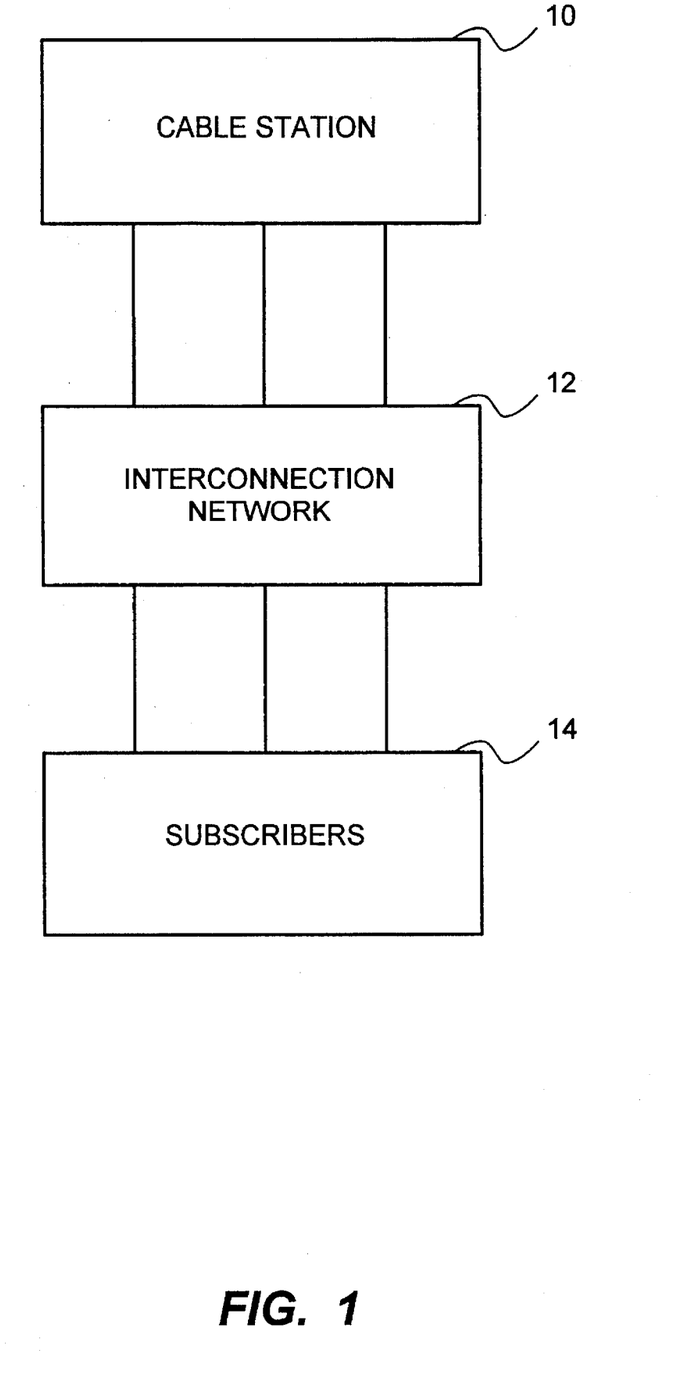
FIG. 1 is a block diagram of a video-on-demand system of a preferred embodiment of the present invention.

The preferred embodiment of the present invention is adapted for use in a video-on-demand server system like that shown in FIG. 1. The system depicted in FIG. 1 is a video-on-demand server system in which subscribers may request at any point in time to view particular video image sequences transmitted from the cable station 10. The cable station 10 transmits the data for the video image sequences over the interconnection network 12 to the subscribers 14. The interconnection network 12 may be any suitable interconnection mechanism, including an asynchronous transfer mode (ATM) network. Functionally, the interconnection network 12 acts like a crosspoint switch. The cable station 10 preferably makes available a large number of different video image sequences that may be transmitted to the subscribers 14 and viewed in real time. The data for the video image sequences may contain video data, audio data and other types of data, such as closed captioning data. Moreover, the present invention may be applied solely to audio data or other types of data sequences.

For such a video-on-demand server system, the choice of video image sequence viewed by a subscriber is not pre-scheduled. Viewing choices are scheduled upon subscriber demand. A subscriber need not choose a video image sequence that other subscribers are watching; rather, the subscriber may choose from any of the available video image sequences. Furthermore, each subscriber chooses when he wishes to start viewing a video image sequence. A number of different subscribers 14 may be concurrently viewing different portions of the same video image sequence. A subscriber may select where in a sequence he desires to start viewing and can stop watching a sequence before the entire sequence has been viewed.

Figure 2:
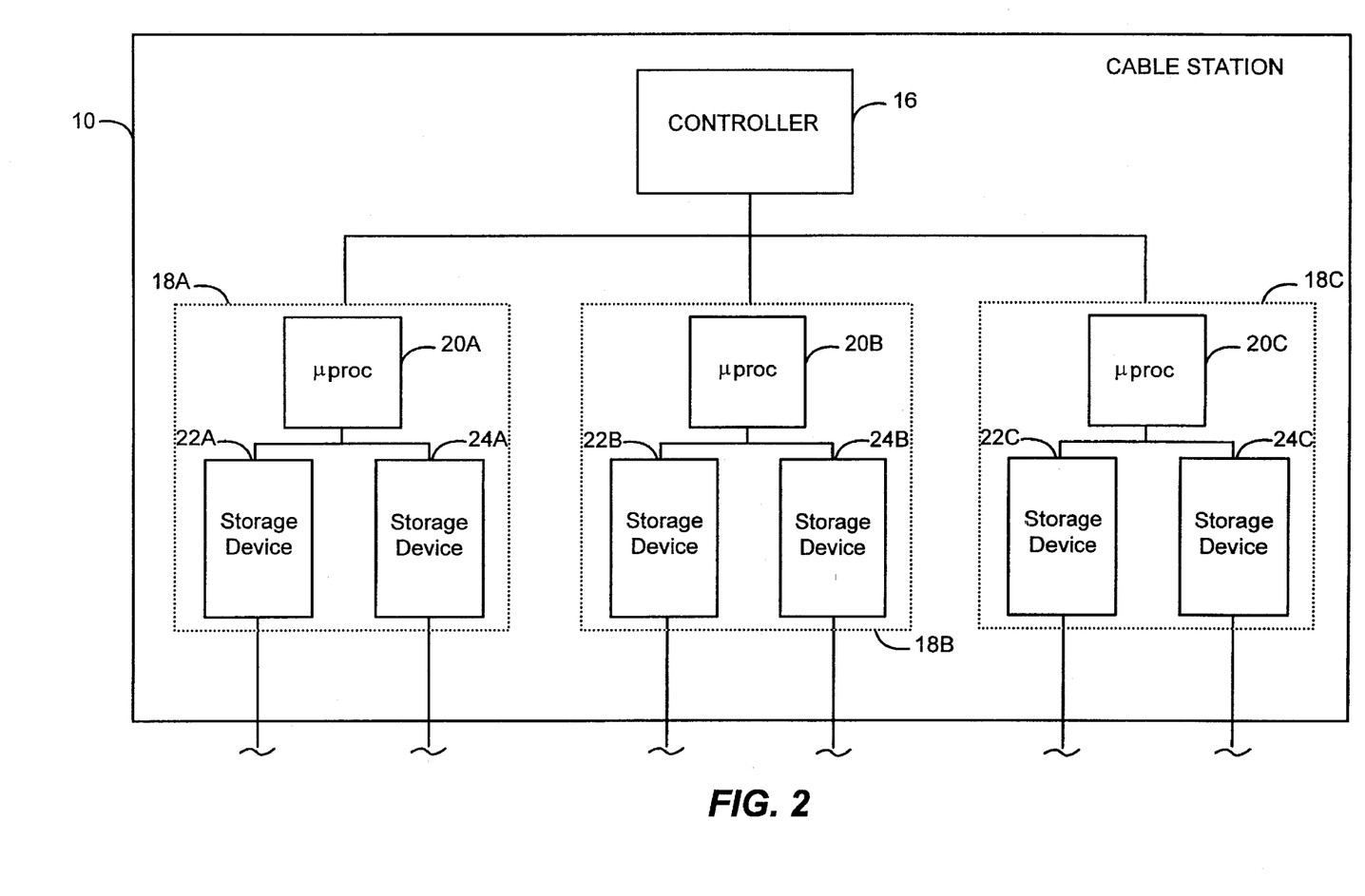
FIG. 2 is a more detailed block diagram of the cable station of FIG. 1.

FIG. 2 is a block diagram showing the cable station 10 in more detail. The cable station 10 acts as a video on-demand server. The cable station 10 includes a controller 16 that is responsible for scheduling transmission of video image sequences to subscribers 14 (FIG. 1). The controller 16 controls several subsystems 18A, 18B, and 18C and is responsible for scheduling and directing output from the subsystems to subscribers 14. The controller may be duplicated to provide a backup controller that enhances the fault tolerance of the system. Although only three subsystems are shown in FIG. 2, those skilled in the art will appreciate that, in most instances, it is more suitable to employ a larger number of subsystems. Only three subsystems are shown in FIG. 2 for purposes of simplicity and clarity.

Each subsystems 18A, 18B, and 18C includes a microprocessor 20A, 20B, and 20C that is responsible for controlling respective pairs of storage devices (22A, 24A), (22B, 24B) and (22C, 24C). The data for the video image sequences that are available to the subscribers 14 are stored on the storage devices 22A, 24A, 22B, 24B, 22C and 24C. Each subsystems 18A, 18B, and 18C need not include two storage devices, rather each subsystem may include only one storage device or may, alternatively, include more than two storage devices. The microprocessors 20A, 20B, and 20C are responsible for cooperating with the controller 16 to transmit the data for the video image sequences stored on the storage devices to the subscribers 14.

Storage devices 22A, 22B, 22C, 24A, 24B and 24C may be, for instance, magnetic disk drives or optical disk drives.

Those skilled in the art will appreciate that any suitable storage device may be used for storing the data for the video image sequences. For instance, RAM, masked ROM, EPROM and flash EPROMs may be used to store the video image sequences in the present invention.

Figure 3:
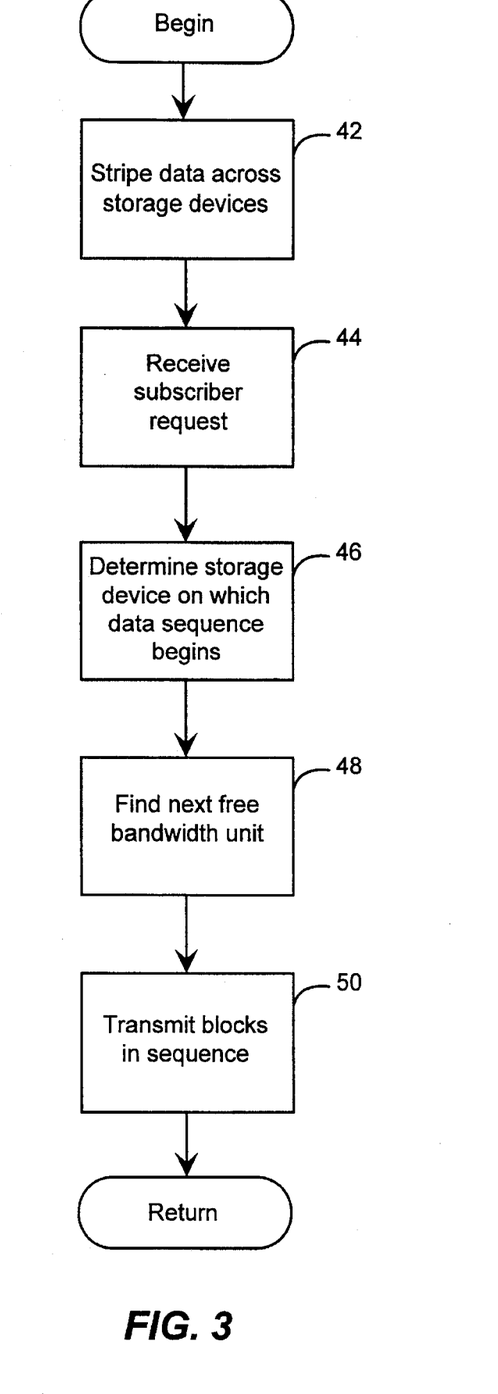
FIG. 3 is a flowchart providing a high level view of the steps performed by the preferred embodiment of the present invention.

FIG. 3 is a flowchart of steps performed by the preferred embodiment of the present invention. Initially, video image sequences are stored across (i.e., striped) the storage devices 22A, 22B, 22C, 24A, 24B, and 24C (FIG. 2) of the video-on-demand server system (step 42 in FIG. 3). Multiple copies of a video image sequence may be stored in the cable station 10. This step is likely only performed once for each copy of a video image sequence stored in the cable station 10 and is not repeated for each subscriber. The motivation for striping the video data of the video image sequences is to increase the efficiency with which data is output by the storage devices in a bounded amount of time and to balance load requirements on each storage device.

Figure 4:
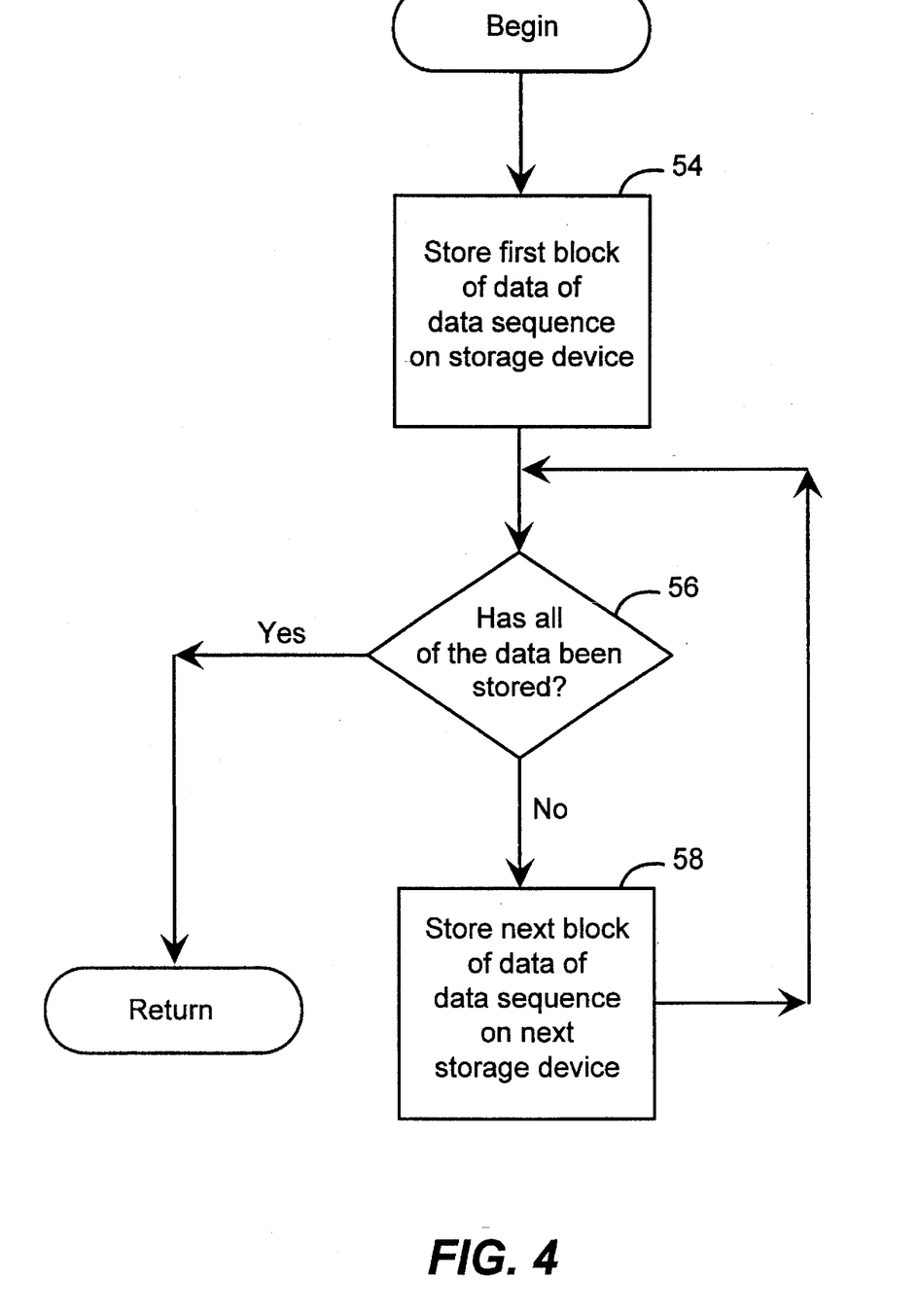
FIG. 4 is a flowchart illustrating in more detail how video image sequences are stored in the preferred embodiment of the present invention.

FIG. 4 is a flowchart showing the steps performed by the preferred embodiment of the present invention to stripe the video image sequences across the storage devices 22A, 22B, 22C, 24A, 24B and 24C (i.e., to perform step 42 of FIG. 3). The first block of a video image sequence is stored on a designated storage device (step 54). As mentioned above, it should be appreciated that more than one copy of a video image sequence may be striped across the storage devices. As such, there may be more than one storage device upon which each block of the video image sequence is stored. Block size is variable, but typically, a block includes 64 kilobytes to 4 megabytes of data. Block size is bounded by an upper limit that may not be exceeded. After the first block of the video image sequence has been stored on the designated storage device, a determination is made if all of the blocks of data for the video image sequence have already been stored on the storage devices (step 56). If not, the next block of data for the video image sequence is stored on a next storage device in a predetermined sequence of storage devices (step 58). Each consecutive block of data for the video image sequence is stored on a next storage device in the predetermined sequence. Steps 56 and 58 are then repeated until all of the data for the video image sequence has been stored across the storage devices. The predetermined sequence wraps around to the beginning when the end of the sequence is reached. As a result of this process, the data for the video image sequence is striped across the storage devices. The steps shown in FIG. 4 are performed for each video image sequence that is stored in the system of the preferred embodiment of the present invention.

After the completion of step 42 in FIG. 3 of storing the video image sequence, the cable station 10 receives a subscriber request to view a video image sequence (step 44). In response to the subscriber request, the preferred embodiment of the present invention determines how to exploit the available output bandwidth to service the subscriber's request. The first step in exploiting the available bandwidth is determining the drive on which the initial block to be viewed in the video image sequence is stored (step 46). If the subscriber is viewing the video image sequence from the beginning of the sequence, the initial block is the first block in the sequence. However, where the subscriber desires to view the video image sequence beginning at some intermediate point, the initial block is the first block that the subscriber desires to view. The preferred embodiment of the present invention maintains a record (described in more detail below) of the storage devices on which each of the available video image sequences begins and more generally, has sufficient knowledge to locate the initial block to be viewed by the subscriber. This information is utilized to perform step 46 of FIG. 3.

Once the storage device that holds the initial block of the requested video image sequence to be viewed has been identified (i.e., step 46), the preferred embodiment of the present invention finds the next free bandwidth unit that may be used to transmit the video data of the requested video image sequence to the requesting subscriber (step 48). The bandwidth unit is the unit of allocation of bandwidth of the video-on-demand system of the preferred embodiment of the present invention. Scheduling for each storage device is done on a column of time slots. Each column including a number of time slots in a sequence that repeats. Each time slot is a bounded period of time that is sufficient for the storage device to output a block of data. A bandwidth unit comprises a time slot from each column of time slots. Each time slot in the bandwidth unit is associated with a different storage device that outputs a block of data of a video image sequence. Since the blocks of data are striped across the storage device, consecutive blocks of data are read from the predetermined sequence of storage devices during the sequence of time slots of the bandwidth unit. The time slots are generated by the controller 16 or other suitable mechanism (FIG. 2).

Figure 5:
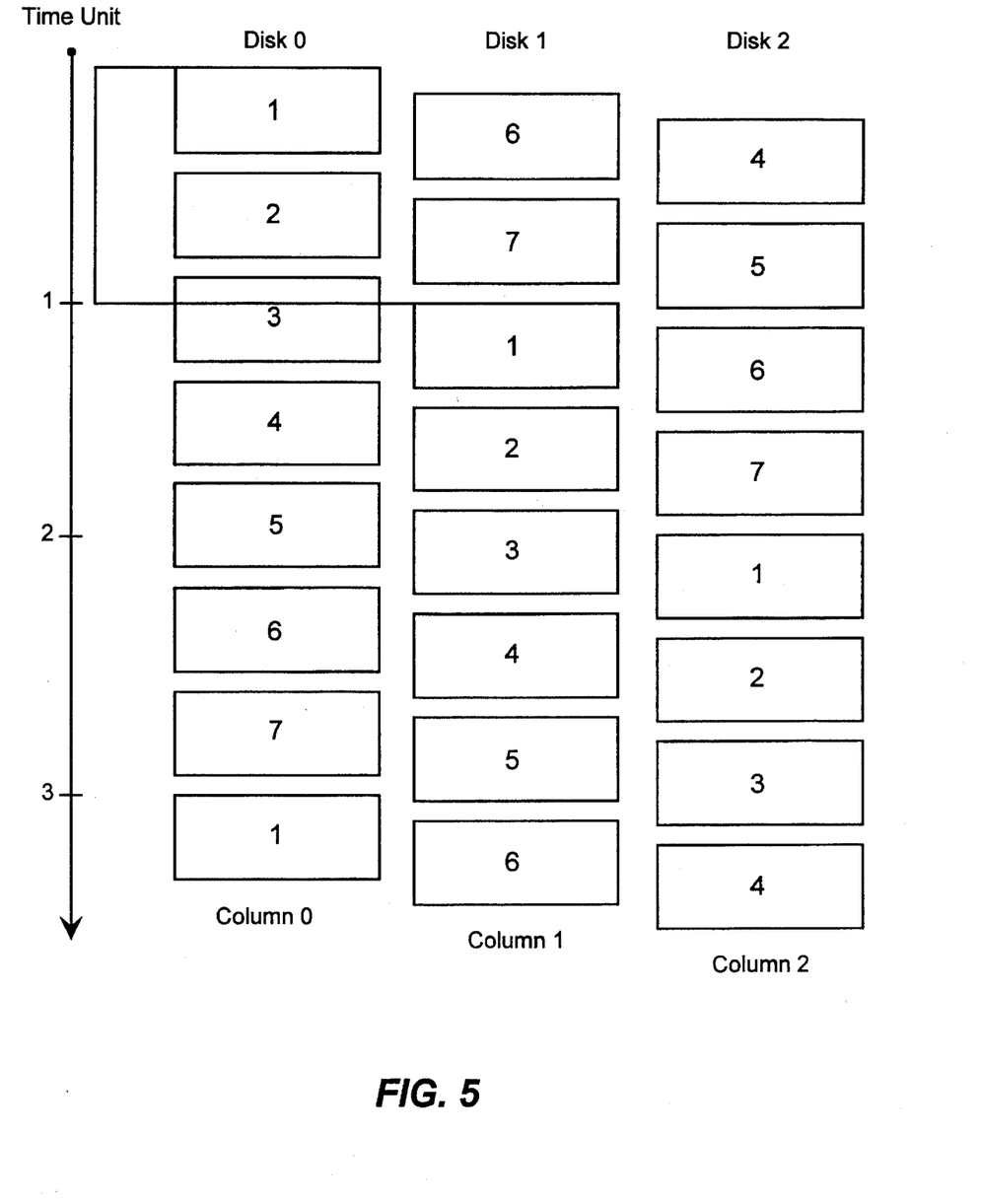
FIG. 5 is a diagram illustrating the scheduling of bandwidth in a three disk drive system in accordance with the preferred embodiment of the present invention.
Figure 6:
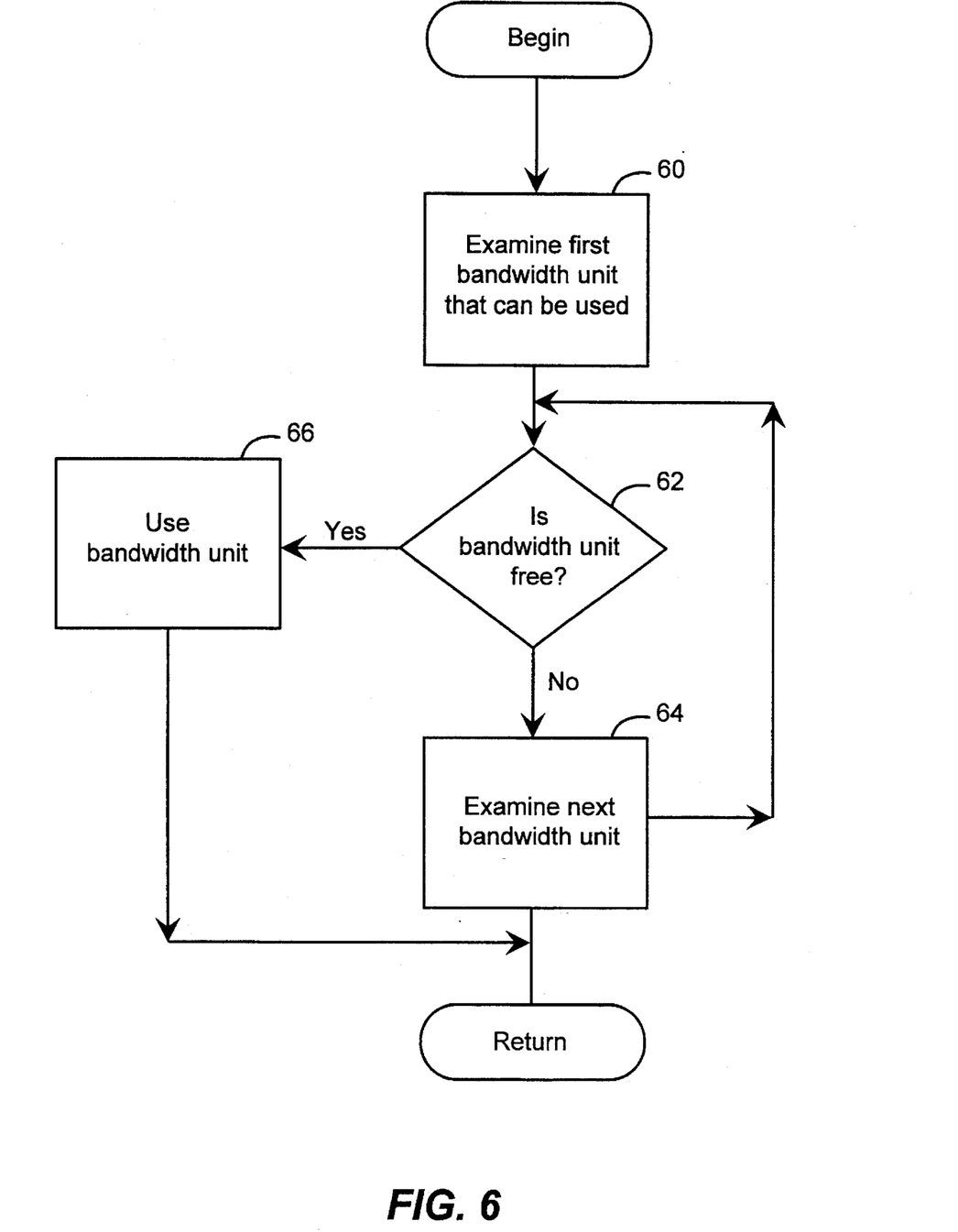
FIG. 6 is a flowchart illustrating the steps performed to locate a bandwidth unit to be allocated to service a subscriber request in the preferred embodiment of the present invention.
Figure 7:
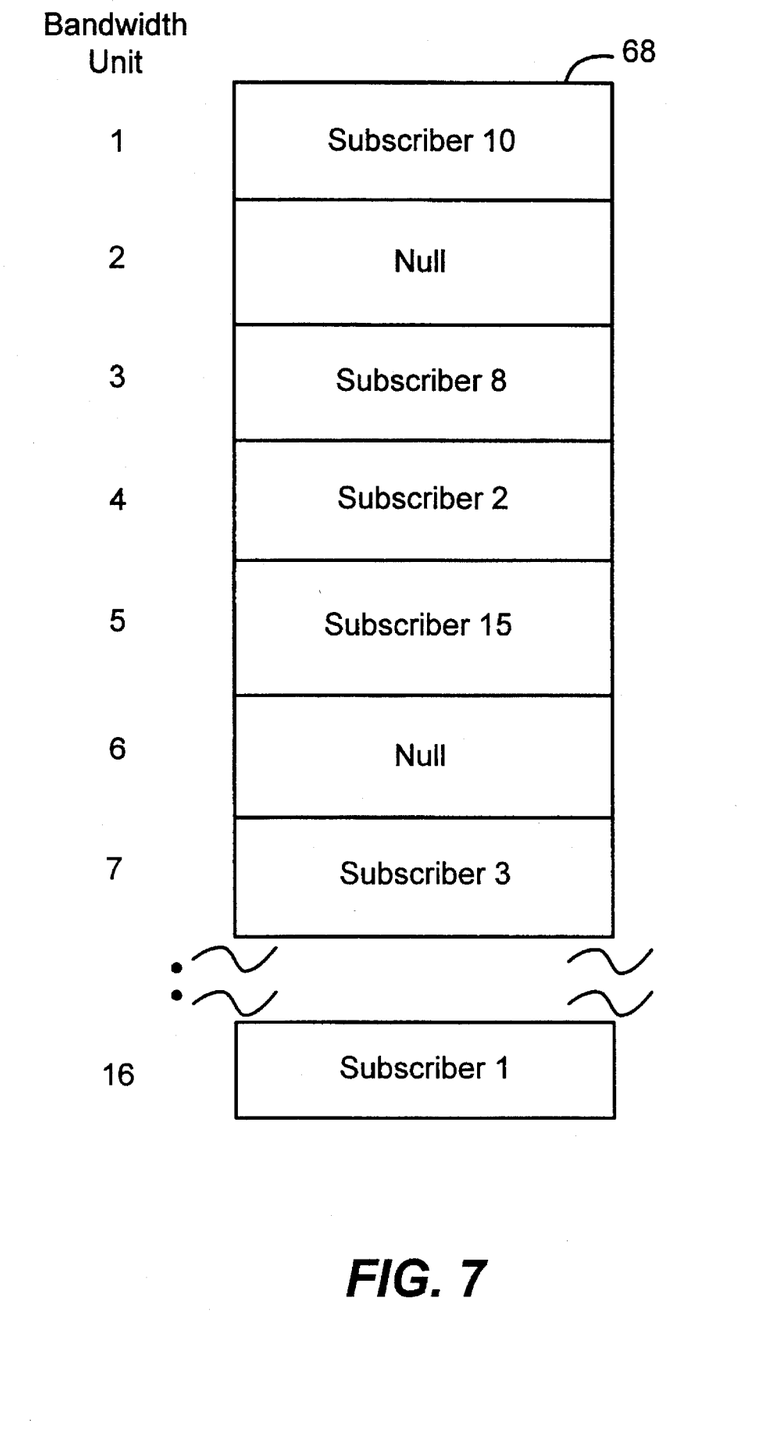
FIG. 7 is a diagram illustrating an example data structure that is maintained in the preferred embodiment of the present invention.

The notions of a column of time slots and a bandwidth unit can perhaps best be explained by way of example. Subscribers are scheduled by bandwidth unit. In other words, they are granted the same numbered time slot in each column. FIG. 5 shows the scheduling of seven subscribers for three storage devices (e.g., disk 0, disk 1 and disk 2). The rectangles shown in FIG. 5 are time slots. The numbers 1–7 in FIG. 5 correspond to the time slot in the respective columns 0, 1 and 2. Time slots of a common bandwidth unit all have the same number. Columns 0, 1 and 2 are all offset temporally relative (i.e., time unit in FIG. 5) to each other, but each column has the same sequence of time slots. As can be seen in FIG. 5, disk drive 0 services each of the subscribers in sequence beginning with the subscriber who has been allocated logical unit of bandwidth 1. In the example of FIG. 5, bandwidth unit 1 includes the time slots labelled 1 in columns 0, 1 and 2. During the slot 1 of column 1, disk drive 0 begins outputting a block of data for a video image sequence to a first subscriber that has been assigned bandwidth unit 1. One time unit later, disk drive 1 outputs the next block of data to the first subscriber during time slot 1 of column 1. Further, at time unit 2, disk drive 2 outputs the next block of data for the video image sequence to the subscriber during time slot 1 of column 2. The predefined sequence of storage devices in this example is disk drive 0, disk drive 1 and disk drive 2, with the sequence wrapping back around to disk drive 0 from disk drive 2. As mentioned above, the preferred embodiment, in step 48 of FIG. 3, finds the next free bandwidth unit that may be allocated to a subscriber to transmit the desired video image sequence to the subscriber. In particular, the preferred embodiment finds the next free time slot on the storage device that holds the initial block to be viewed of the video image sequence. The scheduling in the other columns follows in lock step with the scheduling of the column for this storage device. FIG. 6 is a flowchart of the steps performed by the preferred embodiment of the present invention to find the next free bandwidth unit in step 48. Before delving into the steps of FIG. 6, it is helpful to first introduce a data structure maintained by the system to assist in monitoring bandwidth units. In particular, the preferred embodiment maintains a data structure 68 such as an array, linear list or tree (FIG. 7) for each of the logical units of bandwidth in the system. An entry is provided in the data structure 68 for each of the bandwidth units. The data structure may be stored in memory or some other devices. In the example shown in FIG. 7, there are 16 bandwidth units. Each entry holds either a pointer to the subscriber that is currently allocated the bandwidth unit or a null pointer, which indicates that the bandwidth unit has not yet been allocated. This structure may alternatively be viewed as holding an assignment of time slots to subscribers since each column of time slots follows the same sequence.

As shown in FIG. 6, the first step in finding a free bandwidth unit is to perform a calculation to determine the first bandwidth unit that can be next used, given the current time frame. There is an inherent delay between when a free bandwidth unit is found and when the free logical bandwidth unit can actually be used to output video data which must be accounted for in the determination. In step 60 of FIG. 6, the present invention accounts for clock granularity, communication delay to the interconnection network 12, and communication delay for blocks of video data to be read in locating the next bandwidth unit that should also be considered. Given this calculation, the preferred embodiment of the present invention determines the first bandwidth unit that can be used to output the requested video image sequence to the subscriber (if the bandwidth unit is not already allocated). The found bandwidth unit is examined, and it is determined whether the bandwidth unit is free (step 62). Hence, in step 62 of FIG. 6, the data structure 68 is examined for the found bandwidth unit to determine if it holds a null entry. If the entry for the found bandwidth unit holds a null entry, the found bandwidth unit is free and is used (step 66). On the other hand, if the found bandwidth unit is not free (i.e., it holds a pointer to a subscriber), the entry for the next bandwidth unit is examined to determine if it is free (step 64). In other words, the entry for the next bandwidth unit in sequence held in the data structure 68 (FIG. 7) is examined. Step 62 is then repeated as described above. This process is repeated until a free bandwidth unit is found. By adopting this approach, the preferred embodiment of the present invention assures that any free portion of the available bandwidth may be assigned to a subscriber without undue delay.

Once the free bandwidth unit is found, the subscriber is assigned the free bandwidth unit and the blocks of data of the video image sequence are transmitted in sequence (step 50 in FIG. 3). The cycle is repeated until all the data is output or until the user requests to stop viewing the video image sequence. It should be appreciated that scheduling may be dynamic such that over time users may enter and leave the system and users may start and stop viewing video image sequences. Moreover, it should be appreciated that steps 44, 46, 48 and 50 are performed on a per-subscriber basis. Thus, the subscriber receives the desired data.

Those skilled in the art will appreciate that the present invention may also be applied to the writing of data onto storage devices from subscribers or other data sources. The same steps of dividing scheduling into bandwidth units are performed and during the allocated time slots data is written onto the storage devices rather than read from the storage devices.

While the present invention has been described with reference to a preferred embodiment thereof, those skilled in the art will appreciate the various changes in form and detail may be made without departing from the spirit and scope of the present invention as defined in the appended claims. For instance, other storage mediums may be used and different quantities of storage mediums may be used. In addition, the sequence of storage devices may vary from that shown. Still further, approaches to monitoring assignment of bandwidth units which differ from the linear list described above may be used. In addition, the approach of the present invention is also applicable to guaranteeing input bandwidth.

We claim:

1. In a system having a sequence of storage devices for storing data sequences, comprising blocks of data, as stripes across the storage devices, a method of scheduling transfer of a selected data sequence relative to the storage devices, comprising the steps of:

time multiplexing scheduling of data transfers for each storage device into a sequence of time slots, wherein each time slot is a sufficient amount of time to transfer a block of data for the selected data sequence, and the sequence of time slots for each storage device is the same except that the sequence of time slots for each storage device is time-shifted relative to the sequence of time slots for its predecessor storage device in the sequence of storage devices;

locating a bandwidth unit comprising a like positioned time slot in each sequence of time slots for each storage device in the sequence of storage devices that is not being used; and scheduling the located bandwidth unit to transfer blocks of data for the selected data sequence relative to the storage devices such that during each consecutive time slot of the located bandwidth unit a consecutive block of data for the selected data sequence is transferred relative to the storage devices having the time slots of the located bandwidth unit.

2. The method of claim 1 wherein the scheduling of the located bandwidth unit is performed such that, during each consecutive time slot of the located bandwidth unit, a consecutive block of data for the selected data sequence is transferred relative to a next storage device in the sequence of storage devices.

3. The method of claim 1 wherein the data sequence includes audio data.

4. The method of claim 1 wherein the data sequence includes video data.

5. The method of claim 1 wherein the data sequence includes both audio data and video data.

6. The method of claim 1 wherein a size of each block of data in the selected data sequence is variable but bounded.

7. In a system having a sequence of storage devices for storing data of video image sequences wherein data for each video image sequence includes a sequence of blocks of data and the blocks of data in each sequence are striped across the storage devices, a method of scheduling output of one of the video image sequences, comprising the steps of:

time multiplexing scheduling of data transfer for each storage device into a sequence of time slots, wherein each time slot is a sufficient amount of time for one of the storage devices to output a block of data for one of the video image sequences and the sequence of time slots for each storage device is the same except that the sequence of time slots for each storage device is time-shifted relative the sequence of time slots for its predecessor storage device in the sequence of storage devices;

locating a bandwidth unit comprising a like positioned time slot in each sequence of time slots for each storage device in the sequence of storage devices that is not being used; and scheduling the located bandwidth unit to output blocks of data for a selected one of the video image sequences such that during each consecutive time slot of the located bandwidth unit a consecutive block of data in the sequence of blocks of data for the selected video image sequence is output.

8. The method of claim 7 wherein a first time slot of the located bandwidth unit is scheduled to output a block of data for the selected video image sequence from a storage device that stores an initial block in the video image sequence.

9. The method of claim 7, further comprising the step of outputting blocks of the selected video image sequence from the storage devices during the time slots of the located bandwidth unit as scheduled.

10. The method of claim 9, further comprising the step of outputting blocks of the selected video image sequence from the storage devices during the times of the located bandwidth unit as scheduled during each repetition of the cycle until all of the blocks of data of the selected video image sequence have been output.

11. The method of claim 7 wherein the scheduling of the located bandwidth unit is performed such that, during each consecutive time slot of the located bandwidth unit, a consecutive block of data for the selected video image sequence is output from a next storage device in the sequences of storage devices.

12. The method of claim 7 wherein the video image sequence includes audio data.

13. The method of claim 7 wherein a size of each block of data in the selected video image sequence is variable but bounded.

14. The method of claim 7 wherein the step of locating a bandwidth unit that is not being used further comprises the steps of:

locating a free time slot in the sequence of time slots scheduled for one of the storage devices that holds an initial block of data for the selected video image sequence to be output; and locating a bandwidth unit that includes the located free time slot as the bandwidth unit that is not being used.

15. In a video-on-demand system having a sequence of storage devices for storing video image sequences, a method comprising the steps of striping each video image sequence across the sequence of storage devices such that consecutive blocks of each video image sequence are on a next storage device in the sequence of storage devices;

receiving a request from a subscriber to view a video image sequence;

time multiplexing the scheduling of data transfers for each storage device into a sequence of time slots wherein each time slot is a sufficient amount of time to output a block of a video image sequences from one of the storage devices and the sequence of time slots for each storage device is the same except that the sequence of time slots for each storage device is time-shifted relative to its predecessor in the sequence of storage devices;

in response to the subscriber request, locating a bandwidth unit comprising a like positioned time slot in each sequence of time slots for each storage device in the sequence of storage devices that is not being used; and scheduling the located bandwidth unit to output blocks of data of the video image sequence to the subscriber during each time slot of the bandwidth unit.

16. The method of claim 15 wherein the step of locating a bandwidth unit that is not being used further comprises the steps of:

locating a free time slot in the sequence of time slots scheduled for one of the storage devices that holds an initial block of data for the selected video image sequence to be output; and locating a bandwidth unit that includes the located free time slot as the bandwidth unit that is not being used.

17. A system comprising:

a plurality of storage devices logically organized into a sequence for storing data sequences, having blocks of data, said data sequences each being striped across the sequence of storage devices;

a time multiplexer scheduler for dividing time into time slots for each storage device and scheduling transliar of data relative to each storage device as a sequence of time slots, wherein each time slot is a sufficient amount of time to output a block of data in a data sequence and the sequence of time slots for each storage device being the same but each sequence of time slots for a storage device being time-shifted relative to the time slot sequence for a predecessor storage device into the sequence of storage devices;

a free bandwidth unit locator for locating a free bandwidth unit comprising a like positioned time slot in each sequence of time slots for each storage device in the sequence of storage devices that is not being used;

an assignment mechanism for cooperating with the time-multiplexing scheduler to schedule a free bandwidth unit located by the free bandwidth unit locator to transfer blocks of data of a data sequence such that a block of data is transferred relative to one of the storage devices during each time slot of the located bandwidth unit.

18. The system of claim 17 wherein the storage devices are optical disk drives.

19. The system of claim 17 wherein the storage devices are magnetic disk drives.

20. The system of claim 17 wherein the storage devices are RAM devices.

21. The system of claim 17 wherein the storage devices are EPROM devices.

22. The system of claim 21 wherein the storage devices are flash EPROM devices.

23. The system of claim 21 wherein the storage devices are ROM devices.

\* \* \* \* \*

UNITED STATES PATENT AND TRADEMARK OFFICE
CERTIFICATE OF CORRECTION

PATENT NO.     : 5,473,362
DATED          : December 5, 1995
INVENTOR(S)    : Robert P. Fitzgerald, Joseph S. Barrera, III, William J. Bolosky, Richard P. Draves, Jr., Michael B. Jones, Steven P. Levi, Nathan P. Myhrvold, Richard F. Rashid, Garth A. Gibson..

It is certified that error appears in the above identified patent and that said Letters Patent is hereby corrected as shown below:

In column 9, claim 17, line 13, please delete "transliar" and insert therefor--transfer--.

Signed and Sealed this

Fourth Day of June, 1996

*Attest:*

BRUCE LEHMAN

*Attesting Officer*     *Commissioner of Patents and Trademarks*